May 26, 1964    E. A. HAYDEN    3,134,409
ATTACHMENT FOR CHAIN SAWS
Filed Oct. 13, 1960    3 Sheets-Sheet 3
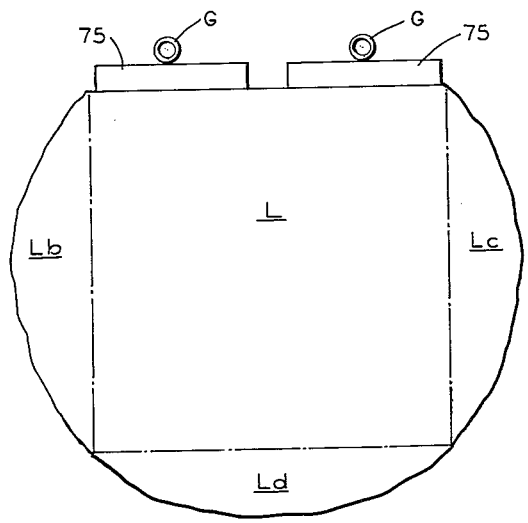
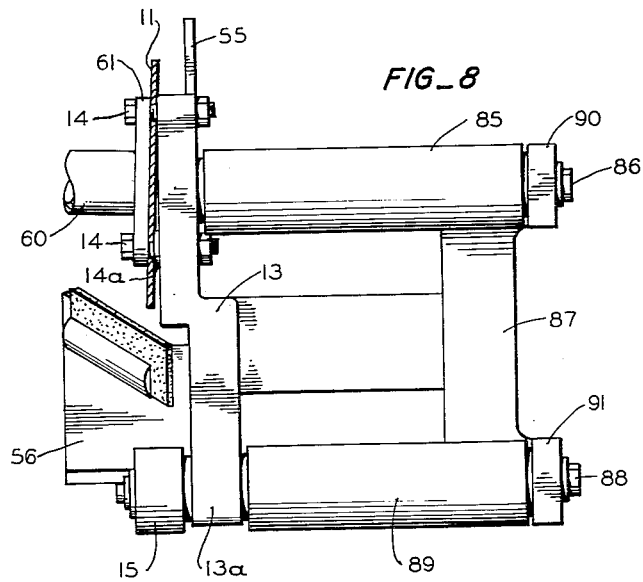
INVENTOR.
ERNEST A. HAYDEN
BY
ATTORNEYS

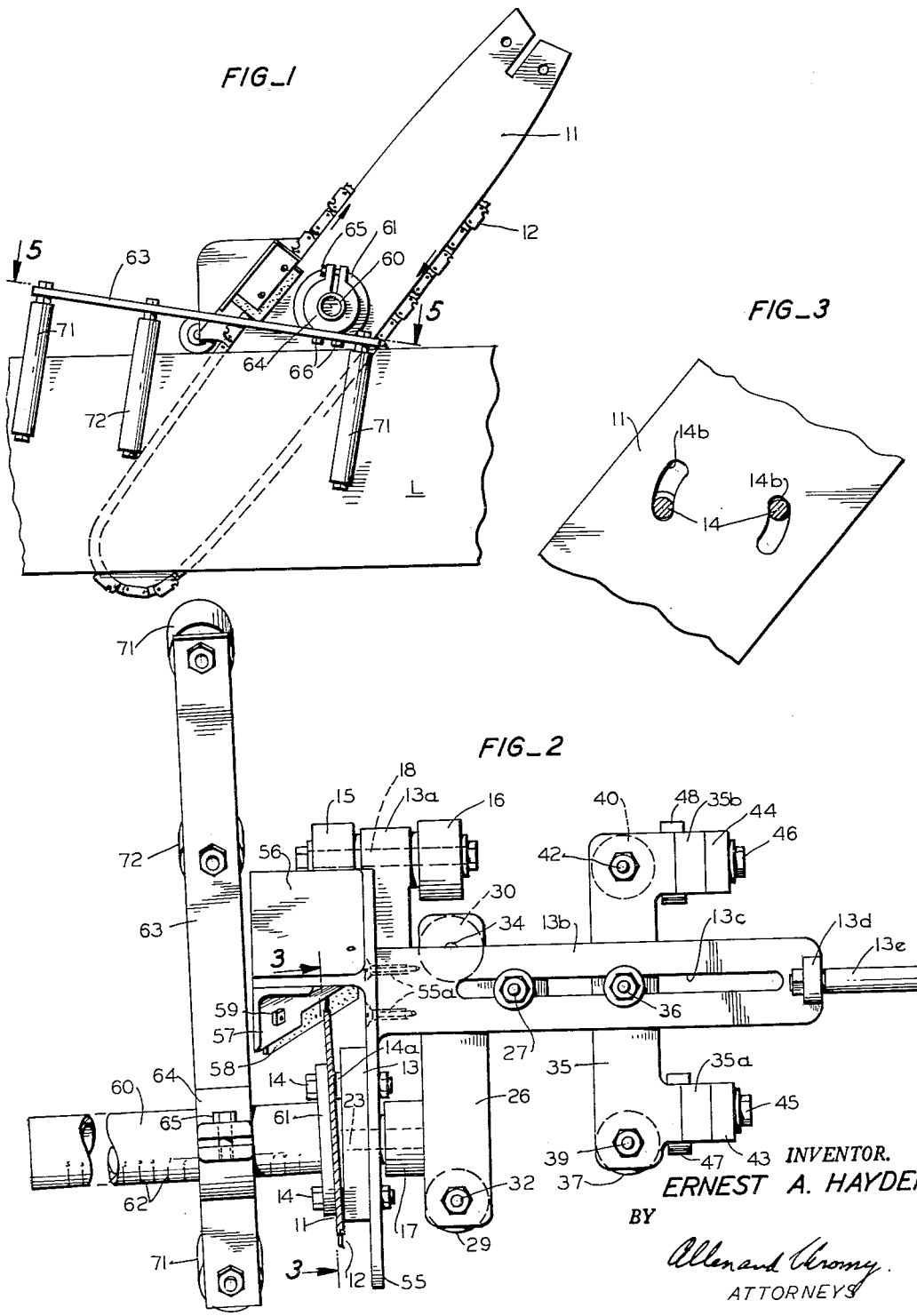

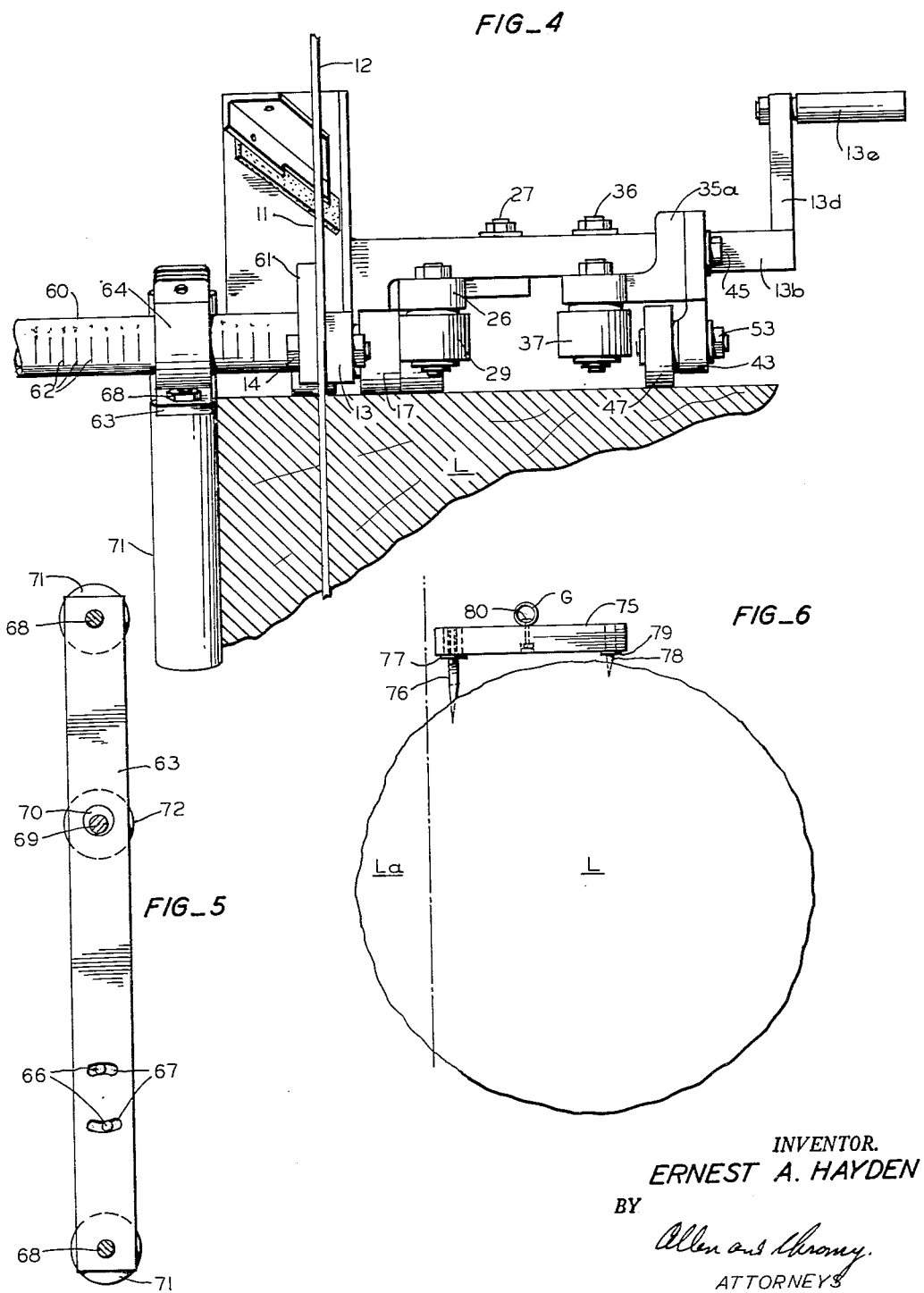

United States Patent Office 3,134,409
Patented May 26, 1964

3,134,409
ATTACHMENT FOR CHAIN SAWS
Ernest A. Hayden, P.O. Box 248, Callahan, Calif.
Filed Oct. 13, 1960, Ser. No. 62,403
9 Claims. (Cl. 143—32)

This invention relates to guides for saws in general. More particularly, this invention relates to a guide which may be attached to a portable saw for use in sawing lumber from logs and the like.

An object of this invention is to provide a lumber sawing attachment for chain saws and the like whereby the saw may be used for producing cants from rough logs and thereafter it may be used for sawing such cants into boards or other lumber.

Another object of this invention is to provide an improved apparatus whereby chain saws or similar portable power saws may be used for producing cants from rough logs and thereafter the cants may be sawed up thereby into boards having different predetermined thicknesses as desired.

Other and further objects of this invention will be apparent to those skilled in the art to which it relates from the following specification, claims and drawing.

In accordance with this invention, there is provided an improved lumber sawing attachment whereby a chain saw or other portable power-driven saw may be employed in trimming up logs into cants and thereafter sawing the cants into boards of predetermined and different thicknesses as desired. All of this may be accomplished directly in the forest or farm yard without necessitating hauling the logs over rough terrain to a saw mill.

The rough log is first provided with an adjustable board or other flat surface on which there is attached an elongated guide member which is employed in conjunction with the carriage of this apparatus for guiding the chain saw during the trimming off of one side of the rough log, thereby providing a smooth sawed surface to the log. Thereafter the log is turned through an angle of approximately 90 degrees and the two opposite rough sides are trimmed off. The log is then given another 90 degree turn and the fourth side is trimmed off thereby producing a cant. The apparatus of this invention is provided with elongated rollers which are adjustable and may be brought up to engage a side of the cant while the carriage supports the chain saw on the top thereof while it is sawed into boards of various predetermined thicknesses.

Further features and details of this invention will be set forth in the specification, claims and drawing in which, briefly:

FIG. 1 is a view in side elevation showing a part of the chain saw and the attachment of this invention positioned on a cant during the sawing or slabbing thereof into boards;

FIG. 2 is a top view of the apparatus shown in FIG. 1;

FIG. 3 is a sectional view taken along the line 3—3 of FIG. 2;

FIG. 4 is a rear view of the apparatus shown in FIG. 1 as positioned on a cant;

FIG. 5 is a sectional view taken along the line 5—5 of FIG. 1;

FIG. 6 is an end view of a log with a board providing a flat track on the upper surface of the log anchored thereto and this board is shown provided with an elongated guide member for cooperating with the carriage shown in FIG. 2;

FIG. 7 is an end view of a partially trimmed log which is to be further trimmed into a cant; and FIG. 8 is a bottom view of a modified form of chain saw carriage.

Referring to the drawing in detail there is illustrated a chain saw attachment that is adapted to be used with conventional chain saws and enables the operator thereof to trim the rough sides off of a log and thereafter saw boards of different thicknesses therefrom. This apparatus is adapted to employ the guide and carriage attachment disclosed in my application, Serial No. 862,357, filed December 28, 1959, for Lumber Saw Attachments for Chain Saws, for the initial trimming or squaring of the rough log and thereafter this same carriage attachment, or a different attachment as disclosed herein, may be used in conjunction with this chain saw guide to cut boards of predetermined thicknesses off of the trimmed or squared log.

Reference is made herein to the aforesaid application in which the chain saw is provided with a carriage that comprises a frame member 13 which may be of cast metal such as aluminum, iron or the like, and which is attached to the bar 11 of the chain saw by means of suitable bolts 14. The bar 11 is provided with suitable holes 14b, which may be of arcuate shape as shown in FIG. 3 for receiving the bolts 14. The holes 14b are made of arcuate configuration so that the bar 11 and the chain saw 12 carried thereby may be angularly adjusted within predetermined limits, as determined by the lengths of these elongated holes, with respect to the carriage frame 13 so that the angle of the chain saw with respect to the log L may be adjusted whereby the tendency of the chain saw to feed itself into the log may be controlled. Thus in sawing soft wood the chain saw may be almost vertical with respect to the log so that the saw will not tend to feed itself into the log too rapidly and for hard wood the saw may be tilted to a greater extent since more effort is required to feed the saw into the harder wood. The carriage frame 13 includes a member 13b which is provided with a slot 13e in which the bolts 27 and 36 are adapted to be lodged. These bolts are provided for the purpose of attaching the cross members 26 and 35 to the frame member 13b. Also extending from the frame is a member 13a which projects forward and which has a shaft 18 secured in a hole provided therein for the purpose of rotatably supporting the rollers 15 and 16 on the frame. The frame 13 also has secured therein the shaft 23 which provides a support for the roller 17.

The members 26 and 35 are provided with suitable vertically extending pins secured thereto for the purpose of rotatably supporting the guide-engaging rollers thereon. Thus the rollers 29 and 30 are supported on the pins or shafts 32 and 34, respectively, on the member 26 and the rollers 37 and 40 are rotatably supported by the pins 39 and 42, respectively, which are secured in the member 35. These rollers 29, 30, 37 and 40 are adapted to engage the sides of the tubular member and guide G shown in FIGS. 6 and 7 as will be described hereinafter.

The member 35 is provided with upwardly extending parts 35a and 35b to which the roller supporting members 43 and 44, respectively, are attached by means of the bolts 45 and 46, respectively. The members 43 and 44 are provided with pins or shafts for rotatably supporting the rollers 47 and 48, respectively, which are adapted to engage the top surface of the board 75 shown in FIG. 6, or the top flat surface of a trimmed or trued log, and these rollers 47 and 48 may be adjusted up or down with respect to the carriage frame by loosening the bolts 45 and 46 so that the angle of the saw bar 11 and chain saw 12 with respect to the side of the log may be slightly adjusted within certain limits as determined by the adjustment afforded between the members 43 and 35a, and the members 44 and 35b. The frame member 13b is also provided with an upright portion 13d to which is attached a handle 13e which may be gripped by the operator during use of this apparatus.

A guide supporting tubular member 60, shown in FIGS. 2 and 4, extends laterally from the saw bar and is provided with a flange 61 at one end thereof for attaching it to the side of the saw bar 11 by means of the bolts 14 which extend through suitable holes formed in the flange 61. This guide support 60 is provided with graduations 62 along the length thereof which are to be used in adjusting the position of the saw guide on the support 60 so that boards of predetermined thicknesses may be sawed off of the log as will be described hereinafter.

The slotted clamping member 64 is adapted to be adjustably supported by the member 60 and it is adapted to be clamped around the support 60 by means of the bolt 65 as shown in FIG. 1. The bar 63 is attached to the clamping member 64 by the bolts 66 which extend through holes 67 formed in the bar 63 and are threaded into the clamping member 64. The holes 67 are of elongated arcuate configuration as shown in FIG. 5 so that the angle of the bar 63 may be adjusted with respect to the clamping member 64 and the support 60. This is an important feature because these slotted holes permit the saw to be set to lead slightly toward the cant away from the board being cut, and allowing variance in this lead is very important particularly in chain saws which may be imperfectly filed or which may have imperfect bars.

The bar 63 is provided with a pair of bolts 68, one of which is supported in a hole near the forward end and the other of which is supported in a hole near the rear end thereof for the purpose of supporting the elongated rollers 71 which are adapted to rotatably engage the sides of the trued log L, as shown in FIGS. 1 and 4. Another roller 72 is supported on the bar 63 by the bolt 69 between the rollers 71 as shown in FIG. 1 and the roller 72 is adjustable with respect to the bar 63. For this purpose an eccentric 70 shown in FIG. 5 is attached to the bolt 69 and this eccentric engages the bar 63 in a suitable hole so that the roller 72 may be adjusted either inward or outward with respect to the outer surface of the log from which the board is sawed. This feature is particularly useful to enable the operator to straighten a saw cut in cases where irregularities appear in the outer surface of the board being sawed off of the log as will be described.

In using this apparatus for sawing logs into boards or the like the apparatus is first employed for sawing off the rough bark and trimming up the log so as to produce a cant of substantially rectangular cross-section. Thus the rough log L is provided with a board 75 as shown in FIG. 6 and this board extends over the length of the log and is supported thereon by means of the members 76 and 78 which are threaded into suitable sleeves 77 and 79 respectively. These sleeves are fixedly positioned in the board at spaced positions over the length thereof. The members 76 and 78 are suitably pointed at their lower ends so that they may be driven into the log and the board 75 rigidly supported thereon. Also, the members 76 and 78 may be adjusted with respect to the board by threading them into or out of the sleeves as may be necessary. The upper surface of the board 75 is provided with a guide G which is attached thereto by means of bolts such as the bolt 80, the heads of which are positioned inside of the pipe so that they do not interfere with the movement of the carriage. The guide G is employed to cooperate with the rollers 29, 30, 37 and 40 while this apparatus is employed for the purpose of sawing off the section La of the log. During this trimming operation the side guide rollers 71 and 72 are not used and the clamping support 64 is removed off of the tubular laterally extending member 60. Thus, in trimming the log the chain saw and the carriage therefor are employed with the carriage riding on the board 75 and straddling the guide G as described in my application Serial No. 862,357.

After the section La is sawed off of the log the log is turned through an angle of 90 degrees and the board 75 is mounted on the flat trimmed side as shown in FIG. 7 and that the section Lb is sawed off of the log in the next operation. For this purpose, the board 75 may be attached to the log by nailing it thereto. After the section Lb is removed from the log the board 75 is shifted to the right as shown in FIG. 7 and the section Lc is trimmed off of the log. Thereafter the board 75 is removed and the log is turned another 90 degrees so that the section Ld may be removed.

After the log is trimmed so that it is substantially square or rectangular in cross-section then the side rollers 71 and 72 are attached to the support 60 by placing the clamping member 64 which supports the bar 63 on the support 60. The clamping member 64 is attached to the support 60 and it is adjusted in accordance with the scale 62 so that predetermined desired thickness of board or other lumber members may be sawed off of the trimmed log or cant as shown in FIG. 4. In this operation when the cut is being started in one end of the log the saw is held in almost vertical position and both the forward roller 71 and roller 72 are positioned against the side of the log. As the saw is urged into the log its position is gradually tilted into that shown in FIG. 1. After both the forward roller 71 and roller 72 are used to assist guiding the saw into the log the bolt 69 supporting the roller 72 is loosened slightly, so that this roller may be moved away from the log to ride over slight irregularities in the previous saw cut. Thus this apparatus in sawing boards from a log functions somewhat as a planer in that the front and back rollers 71 ride on the outer surface of the board being sawed and the saw is therebetween while the roller 72 is in the nature of an idler roller. Consequently, if the outer surface of the board being sawed is slightly irregular or has small humps therein, the front and back rollers 71 will straddle these humps and the effect of these humps will not be passed on to the saw and the cut being performed by the saw will be straight.

Also during this sawing operation the small spacer washer 14a provided between the bar 11 and the frame 13 as shown in FIG. 2 plays an important part inasmuch as it is provided to cambre the saw carriage inward toward the cant and away from the board being cut. This is for the purpose of causing a travel of the carriage at a slight angle with respect to the line of the saw cut, holding the side rollers snugly against the outer surface of the board being cut. Thus the saw line of cut follows very closely the plane of the side rollers.

After the log is trimmed as shown in FIG. 7 to produce a cant and it is desired to slab this up into boards, it is no longer necessary to employ the board 75 and guide G for guiding the chain saw carriage during the board sawing or slabbing operation. In this operation a simplified form of carriage such as shown in FIG. 8 may be employed. This carriage also is provided with a frame 13 to which the saw bar 11 is attached by means of the bolts 14 and the flange 61 of the tubular member 60 is also supported by these bolts 14 on the saw bar 11 and carriage 13, since the rollers 71 and 72 are employed with this form of the invention. This carriage employs long rollers 85 and 89 which are positioned on suitable shafts 86 and 88, respectively. One end of the shaft 86 is fixedly attached to the frame member 13 and the other end is fixedly attached to the member 90. One end of the shaft 89 is attached to the member 91 and the other end portion extends through the frame member 13a and the short roller 15 is positioned thereon. The members 90 and 91 extend downwardly from the opposite ends of the cross-piece 87. The roller 15 in this case is positioned on the free end of the shaft 88 and corresponds to a like membered roller shown in FIG. 2. In the carriage shown in FIG. 8 the roller 85 takes the place of the rollers 17 and 47 of the carriage shown in FIG. 2, while the roller 89 takes the place of the rollers 16 and 48. The guide engaging rollers 29, 30, 37 and 40 have been eliminated from the embodiment shown in FIG. 8. Also, if desired, a suitable member may be attached to the cross-piece 87 to which a handle such as the handle 13e shown in FIG. 2 may be attached.

While I have shown a preferred embodiment of the invention it will be understood that the invention is capable of variation and modification from the form shown so that its scope should be limited only by the scope of the claims appended hereto.

What I claim is:

1. In a portable apparatus for sawing lumber from logs and the like the combination of a portable power driven chain saw having a chain saw and a saw bar for slidably supporting said chain saw, carriage means attached to said saw bar and extending to one side thereof for supporting said chain saw on the top of a log during the sawing of a board from a side of said log by said chain saw, and guiding means for said saw comprising spaced elongated rollers engaging the outer face of said board during said sawing, means comprising a substantially horizontal member extending to the other side of said saw bar for supporting said rollers on said carriage means, and means attached to said substantially horizontal member for adjusting the position of said rollers in accordance with the thickness of the board that it is desired to saw from the log.

2. In portable apparatus for sawing lumber from logs and the like the combination of a portable power driven chain saw having a chain saw and a saw bar for slidably supporting said chain saw, a frame, means for attaching said frame to one side of said saw bar so that said frame extends laterally to the side of the cutting element of said power driven saw, said frame having a pair of cross members and roller means attached to said members for supporting said frame on the top of the log during the sawing of a board from a side of the log, guide means, a substantially horizontal member attached to the other side of said saw bar, adjustable means for attaching said guide means to said substantially horizontal member, said guide means comprising additional roller means for engaging the outside of said board during said sawing.

3. In portable apparatus for sawing lumber from logs and the like the combination of a portable power driven chain saw having a chain saw and a saw bar for slidably supporting said chain saw, a carriage frame, means for attaching said frame to one side of said saw bar so that said frame extends laterally to the side of the cutting element of said power driven saw, said means including bolts extending through arcuate slots formed in said saw bar so that the angle of said saw bar may be adjusted with respect to said carriage frame, said frame having a pair of cross members, roller means attached to said members for supporting said frame on the log during the sawing of a board therefrom, and guide means comprising a rod attached to the other side of said saw bar and extending laterally therefrom, a plurality of elongated rollers, and means for supporting said elongated rollers on said rod substantially parallel to the outer face of the board being sawed from said log and in engagement therewith for guiding said chain saw during said sawing.

4. In portable apparatus for sawing lumber from logs and the like the combination of a portable power driven chain saw having a chain saw and a saw bar for slidably supporting said chain saw, a carriage frame, means for attaching said frame to one side of said saw bar so that said frame extends laterally to the side of the cutting element of said power driven saw, said means including bolts extending through arcuate slots formed in said saw bar so that the angle of said saw bar may be adjusted with respect to said carriage frame, said frame having a pair of roller means attached to said members for supporting said frame on the log during the sawing of a board therefrom, and guide means comprising a rod supported on the other side of said saw bar by the aforesaid bolts, said rod extending laterally from said saw bar and having a scale from which the thickness of said board may be determined, a plurality of elongated rollers, a bar, means for adjustably attaching said bar to said rod at different positions depending on the desired thickness of said board, and means for supporting said elongated rollers on said bar spaced so that one of said elongated rollers is positioned well ahead of said chain saw and another of said elongated rollers is to the rear thereof.

5. In portable apparatus for sawing lumber from logs, cants and the like the combination of a portable power driven chain saw having a chain saw and a saw bar for slidably supporting said chain saw, a carriage frame, means for attaching said frame to one side of said saw bar so that said frame extends laterally to the side of the cutting element of said power driven saw, said means including bolts extending through arcuate slots formed in said saw bar so that the angle of said saw bar may be adjusted with respect to said carriage frame, said frame having a pair of roller means attached to said members for supporting said frame on the log or cant during the sawing of a board therefrom, and guide means comprising a rod supported on the other side of said saw bar by the aforesaid bolts, said rod extending laterally from said saw bar and having a scale from which the thickness of said board may be determined, a plurality of elongated rollers, a bar, means for adjustably attaching said bar to said rod at different positions depending on the desired thickness of said board, and means for supporting said elongated rollers on said bar spaced so that one of said elongated rollers is positioned well ahead of said chain saw and another of said elongated rollers is to the rear thereof, said means for adjustably attaching said bar to said rod including means for adjusting the angle of said bar with respect to said saw bar so that said saw may be set to lead slightly toward the log or cant and away from the board being cut.

6. In portable apparatus for sawing lumber from logs, cants and the like, the combination as set forth in claim 9 further characterized in that said plurality of elongated rollers includes an elongated roller positioned between the one of said rollers that is positioned ahead of said chain saw and the other of said elongated rollers that is positioned to the rear of said saw and means for adjustably supporting said intermediate elongated roller on said bar so that it may be set coplanar with the other of said elongated rollers during the starting and finishing of a cut, and so that it may be in inoperative position at other times during said cut.

7. In portable apparatus for sawing lumber from logs and the like the combination of a portable power driven saw including a chain saw and a saw bar for guiding said chain saw, a carriage frame, means for attaching said carriage frame to one side of said saw bar so that said frame extends laterally from said side of said saw bar, said carriage frame supporting said power driven saw from the top of said log with the chain saw thereof in substantially vertical position during the cutting operation, roller means, a substantially horizontal member extending to the other side of said saw bar, means attaching said roller means to said substantially horizontal member so that said roller means extends substantially at right angles therefrom, said roller means engaging the outer surface of a board being sawed from the log to control the thickness of said board, said roller means comprising a roller positioned well ahead of said chain saw and another roller positioned to the rear of said chain saw so that slight irregularities in the outer surface of said board will not be transmitted by said additional roller means to said chain saw whereby said chain saw will tend to cut said board of substantially uniform thickness.

8. In portable apparatus for sawing lumber from logs and the like the combination of a portable power driven saw including a chain saw and a saw bar for guiding said chain saw, a carriage frame, means for attaching said carriage frame to one side of said saw bar so that said frame extends laterally from said side of said saw bar, said frame having a pair of cross members, roller means attached to said cross members for supporting said carriage frame and power driven saw on the log being sawed, said carriage frame supporting said power driven saw from the top of said log with the chain saw thereof in substantially vertical position during the cutting operation, additional roller means, a substantially horizontal member, means for attaching said substantially horizontal member to the other side of said saw bar, means attaching said additional roller means to said substantially horizontal member, said attaching means including means for positioning said saw bar at a small angle with respect to said carriage frame so that said additional roller means is held in engagement with the outer surface of a board being sawed from the log, said additional roller means comprising a roller positioned well ahead of said chain saw and another roller positioned to the rear of said chain saw so that slight irregularities in the outer surface of said board will not be transmitted by said additional roller means to said chain saw whereby said chain saw will tend to cut said board of substantially uniform thickness.

9. In portable apparatus for sawing lumber from logs and the like the combination of a portable power driven saw including a chain saw and a saw bar for guiding said chain saw, a carriage frame, means comprising a pair of bolts for attaching said carriage frame to one side of said saw bar so that said frame extends laterally from said side of said saw bar, a washer positioned on one of said bolts between said saw bar and said carriage frame, said frame having a pair of cross members, roller means attached to said cross members for supporting said carriage frame and power driven saw on the log being sawed, said carriage frame supporting said power driven saw from the top of said log with the chain saw thereof in substantially vertical position during the cutting operation, additional roller means, a substantially horizontal member extending to the other side of said saw bar, means attaching said additional roller means to said substantially horizontal member, said washer being positioned to cause said carriage frame to travel at a slight angle with respect to the line of saw cut by said chain saw so that said additional roller means is held in engagement with the outer surface of a board being sawed from the log, said additional roller means comprising a roller positioned well ahead of said chain saw and another roller positioned to the rear of said chain saw so that slight irregularities in the outer surface of said board will not be transmitted by said additional roller means to said chain saw whereby said chain saw will tend to cut said board of substantially uniform thickness.

References Cited in the file of this patent

UNITED STATES PATENTS

| 1,543,165 | Kessler | June 23, 1925 |
| 2,609,848 | Schneider | Sept. 9, 1952 |

FOREIGN PATENTS

| 540,098 | Germany | Dec. 9, 1931 |

OTHER REFERENCES

Special Attachment for Plank Making and Bridge Timber, page 3, Timberhog Chain Saw Catalogue, published 1938. (Copy in Div. 29.)